(12) United States Patent
Riedl et al.

(10) Patent No.: US 8,229,104 B2
(45) Date of Patent: Jul. 24, 2012

(54) FULL DUPLEX TELEPHONE SYSTEM EMPLOYING AUTOMATIC LEVEL CONTROL FOR IMPROVED DIGITAL SIGNAL PROCESSING OF AUDIO SIGNALS

(75) Inventors: Wilhelm Ernst Riedl, Indianapolis, IN (US); Joel David Sawaski, Indianapolis, IN (US); Kent Joseph Nysewander, Mooresville, IN (US); Hung Chi Lai, Fishers, IN (US); Frank Alan Nardelli, Indianapolis, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 0 days.

(21) Appl. No.: 12/214,997

(22) Filed: Jun. 24, 2008
(Under 37 CFR 1.47)

(65) Prior Publication Data
US 2011/0150209 A1  Jun. 23, 2011

(51) Int. Cl.
*H04M 1/00* (2006.01)
(52) U.S. Cl. ............... 379/388.03; 379/406.15; 381/93
(58) Field of Classification Search ............ 379/388.03, 379/388.06, 390.01, 390.03, 388.07
See application file for complete search history.

(56) References Cited

U.S. PATENT DOCUMENTS

| 4,446,335 | A | 5/1984 | Lee et al. |
| 5,386,465 | A | 1/1995 | Addeo et al. |
| 5,857,056 | A * | 1/1999 | Iwami et al. ................ 386/308 |
| 5,907,538 | A | 5/1999 | White |
| 6,195,437 | B1 * | 2/2001 | Markow et al. ................ 381/93 |
| 6,370,245 | B1 | 4/2002 | White |
| 7,158,572 | B2 | 1/2007 | Dunne et al. |
| 7,362,811 | B2 | 4/2008 | Dunne et al. |

* cited by examiner

*Primary Examiner* — Creighton Smith
(74) *Attorney, Agent, or Firm* — Robert D. Shedd; Robert B. Levy; Jeffrey D. Hale

(57) ABSTRACT

Audio processing systems, such as full duplex digital telephone systems, are provided in which analog automatic level control (ALC) circuitry is employed to automatically control and stabilize the microphone output audio signal levels to a constant level for optimal digital signal processing. For example, an audio communication device (10) includes a microphone (11) to generate an audio signal, an analog automatic level control (ALC) circuit (13), coupled to an output of the microphone (11), to control a level of the audio signal output from the microphone (11) and output a level-controlled audio signal, and a DSP (digital signal processing) circuit (14) to process the level-controlled audio signal output from the ALC circuit (13). The ALC (13) allows audio signals to be captured by the microphone (11) with wide dynamic range, while stabilizing the microphone output level within a reduced dynamic range compatible with the limited dynamic range of the DSP circuitry (14) for enhanced performance.

11 Claims, 2 Drawing Sheets

FULL DUPLEX TELEPHONE SYSTEM EMPLOYING AUTOMATIC LEVEL CONTROL FOR IMPROVED DIGITAL SIGNAL PROCESSING OF AUDIO SIGNALS

TECHNICAL FIELD

The present disclosure relates generally to telephone audio processing systems and in particular, digital full duplex telephone systems that implement automatic level control circuitry to enhance the level of performance and to eliminate certain side effects due to the digital processing of the telephone audio signals

BACKGROUND

In general, "full duplex" communication devices, such as full duplex telephones or headsets, can simultaneously transmit and receive audio signals, thereby allowing a user to simultaneously talk and listen to another party through a speakerphone or separate microphone and speaker of the device. With full duplex telephony devices, however, audio signals may be distorted with "echo" signals that are generated due to acoustical and/or electrical feedback. For example, line echo may be generated when some portion of a near end party's speech signals are coupled from the speakerphone microphone circuit to the speaker circuit. Line echo signals are generated due to reflection caused by impedance mismatches along the transmit and receive paths (e.g., due to imperfect impedance match at four-wire to two-wire conversion points, known as hybrids). Another type of echo caused by acoustic feedback is where acoustic coupling occurs between the speaker and the microphone. Acoustic energy produced by the speaker may reflect from nearby objects or be coupled directly to the microphone. This feedback produces a phase delay in the coupled audio signal making a hollow sounding echo.

Moreover, with full duplex speakerphone devices, the microphone output level can affect signal quality. For instance, a microphone output level may be too low when a near end person is talking at a distance of more than 6 feet on the phone. This situation produces a "hollow" or "in a tunnel" sound effect to a listener on the far end of the conversation. Moreover, a microphone output level may be too high when, e.g., when a near end person is talking loud or at a distance of two feet or less. This situation produces excess sidetone within the system, To eliminate or reduce the degraded audio quality due to echoes, full duplex communication devices typically implement various types of acoustic digital signal processing techniques known in the art. For example, Line Echo Cancellation is used to remove relatively short delay components of telephone network line echo (e.g. network Side-Tone) from the incoming receive signal. However, depending on the dynamic range for such digital circuits, performance can be affected by microphone output levels. Indeed, the dynamic range of the microphone output level is typically greater than the dynamic range of the digital signal processing circuitry, e.g., digital Line Echo Cancellation chip. For example, a microphone output level may have a dynamic range of 60 dB, whereas a digital Line Echo Cancellation chip can effectively handle a dynamic range of about 45 to 50 dB.

One conventional solution to limit the dynamic range is to implement digital signal processing functions, such as companding functions, after digitizing the input. However, such solutions are not effective if the dynamic range of the input exceeds the range of the input ND conversion, which adversely affects the echo-canceling capabilities. Another solution is to adjust the microphone output level to minimize one problem or the other, or pick a mid point, which yields both problems.

SUMMARY

Exemplary embodiments of the invention includes audio processing systems, such as full duplex digital telephone systems, in which analog automatic level control (ALC) circuitry is employed to automatically control and stabilize microphone output audio signal levels to a constant level for optimal digital signal processing.

In one exemplary embodiment, an audio communications device includes a microphone to generate an audio signal, an analog automatic level control (ALC) circuit, coupled to an output of the microphone, to control a level of the audio signal output from the microphone and output a level-controlled audio signal, and a DSP (digital signal processing) circuit to process the level-controlled audio signal output from the ALC circuit. The ALC circuit may include a voltage amplifier to amplify the audio signal output from the microphone and generate an amplified audio signal, and an analog control circuit to adjustable control a level of the audio signal input to the voltage amplifier according to a level of the amplified audio signal and increase or decrease the level of the amplified audio signal to a constant level.

In one embodiment, the analog control circuit includes a voltage divider circuit comprising a first fixed resistance connected between a first and second node of the ALC circuit and a second fixed resistance connected between the second node and ground, wherein the first node is coupled to an input of the ALC circuit and wherein the second node is coupled to an input of the voltage amplifier, a shunt active device connected in parallel to the second fixed resistance, wherein the shunt active device has an impedance at audio frequencies that varies by changing a bias of the shunt active device, and a bias control circuit that adjustably controls a bias of the shunt active device based on a level of the amplified audio signal to change an impedance of the shunt device, wherein a change of impedance of the shunt device increases or decrease an audio signal level at the input to the voltage amplifier at the second node.

These and other exemplary embodiments, aspects, features, and advantages of the present invention will become apparent from the following detailed description of the preferred embodiments, which is to be read in connection with the accompanying drawings.

DETAILED DESCRIPTION OF EXEMPLARY EMBODIMENTS

Figure 1:
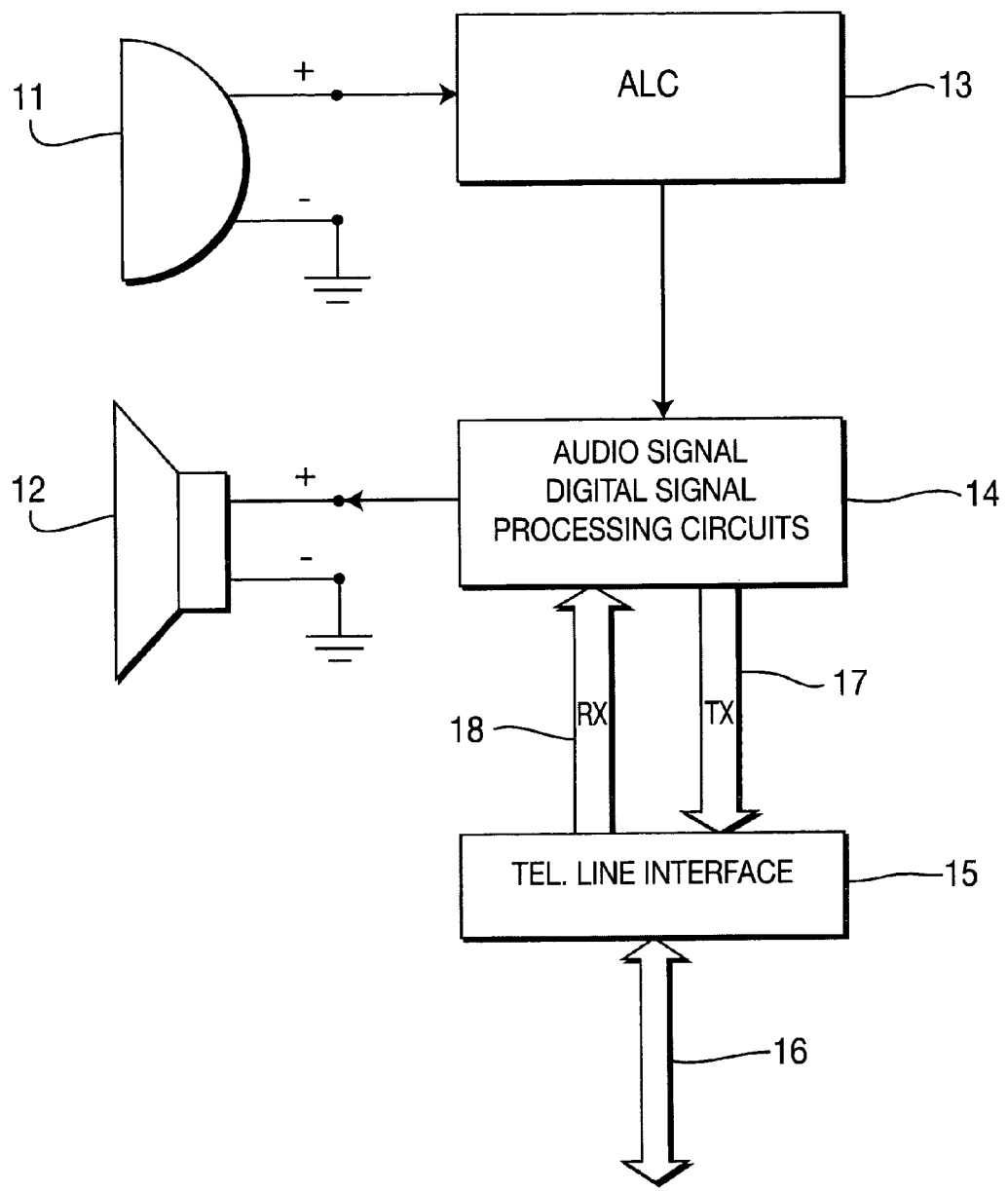
FIG. 1 is a high-level schematic block diagram of a full duplex audio communication system according to an exemplary embodiment of the invention.

FIG. 1 is a high-level schematic block diagram of a full duplex audio communication system (10) according to an exemplary embodiment of the invention. In general, the system (10) comprises a microphone (11), a speaker (12), an ALC (automatic level control) circuit (13), DSP (digital signal processing) circuitry (14), and an interface (15). The interface (15) is coupled to a bidirectional communications channel (16) and separate transmit (17) and receive (18) channels. In one exemplary embodiment of the invention, the interface (15) may be a telephony line interface, such as a hybrid circuit, that converts a two-wire bidirectional telephone line (16) to a four-wire channel comprising a separate 2-wire TX pair (17) and separate 2-wire RX pair (18), as typically used in land telephony systems.

In general, RX audio signals received at the interface (15) from the communications channel (16) are coupled to the receive channel (18) and input to the DSP (14) for digital signal processing and then output to the speaker (12). Further, acoustic energy captured by the microphone (11) is converted to an analog audio input signal that is processed by the ALC (13) and DSP circuits (14) before transmission over the communications channel (16). The level of the audio signal output from the microphone (11) is controlled to a stable level by the ALC circuit (13) and then input to the DSP circuitry (14), which generates a transmit audio signal TX that is output to the TX channel (17) and coupled to the bi-directional communications channel (16) via the interface (15).

The TX and RX analog audio signals that are input to the DSP (14) from the ALC (13) and RX channel (18), respectively, are digitized using ND converters to enable processing of TX and RX audio signals in the digital domain. The DSP circuitry (14) may comprise various types of digital signal processing circuits and methods such as echo cancellation, noise cancellation, sound enhancement, and network echo cancellation and other state of the art monitoring and control techniques to enable full-duplex speech and improved voice clarity. In this regard, it should be understood that the full duplex speakerphone operation is realized by digital signal processing circuits and methods implemented by the DSP (14), wherein the digital signal processing functions may be implemented in hardware via standard ICs or ASICs, or software as part of a signal processing microcomputer and appropriate processing methods, or a combination of hardware and software, depending on the system (10) architecture. For example, the system (10) may be a computer system (e.g., PC) having telephony capabilities and microphone and speaker peripherals. The system (10) may be a headset device for hands free telephony applications, or a videoconferencing speakerphone, etc.

Typically, A/D converters and other digital signal processing circuitry used in communication systems have a limited dynamic range in that the circuits are designed to process analog signals over a specified range of values. In an A/D converter, when the input signal exceeds the specified peak input signal level, output registers of the ND converter overflow. This occurs even when the input voltage exceeds the peak input level by a value that would cause the ND converter output to exceed its maximum level one or more least significant bits. On the other hand, it is preferable that the microphone (11) have a high dynamic range so that low and high levels of acoustic energy (speech input) can be sufficiently captured and converted to electrical audio signals with no or minimal distortion.

The ALC circuit (13) is coupled to the output of the microphone (11) to control a level of the audio signal output from the microphone (11) and output a level-controlled audio signal to the DSP (14) for processing. The ALC (13) automatically controls and stabilizes the microphone output level to a constant level for input to the DSP (14) The ALC (13) controls the output level of the microphone by attenuating high output levels from the microphone to a stable level and boosting low-level microphone output signals to a stable level. The automatic level controller (13) essentially allows audio signals to be captured by the microphone (11) with wide dynamic range, while stabilizing the microphone output level within a reduced dynamic range compatible with the limited dynamic range of the DSP circuitry (14). By using the ALC (13) to stabilize or otherwise reducing the dynamic range of the analog audio signal level input to the DSP (14), the performance level of full-duplex operation can be enhanced by elimination of certain side effects due to the digital processing of telephone audio signals with levels outside the dynamic range or signal/noise ratio capabilities of the DSP (14). The ALC (13) provides an effective, cost efficient solution to enhancing DSP performance without having to implement complex or costly DSP solutions that extend the dynamic range processing capabilities of the DSP circuitry.

Figure 2:
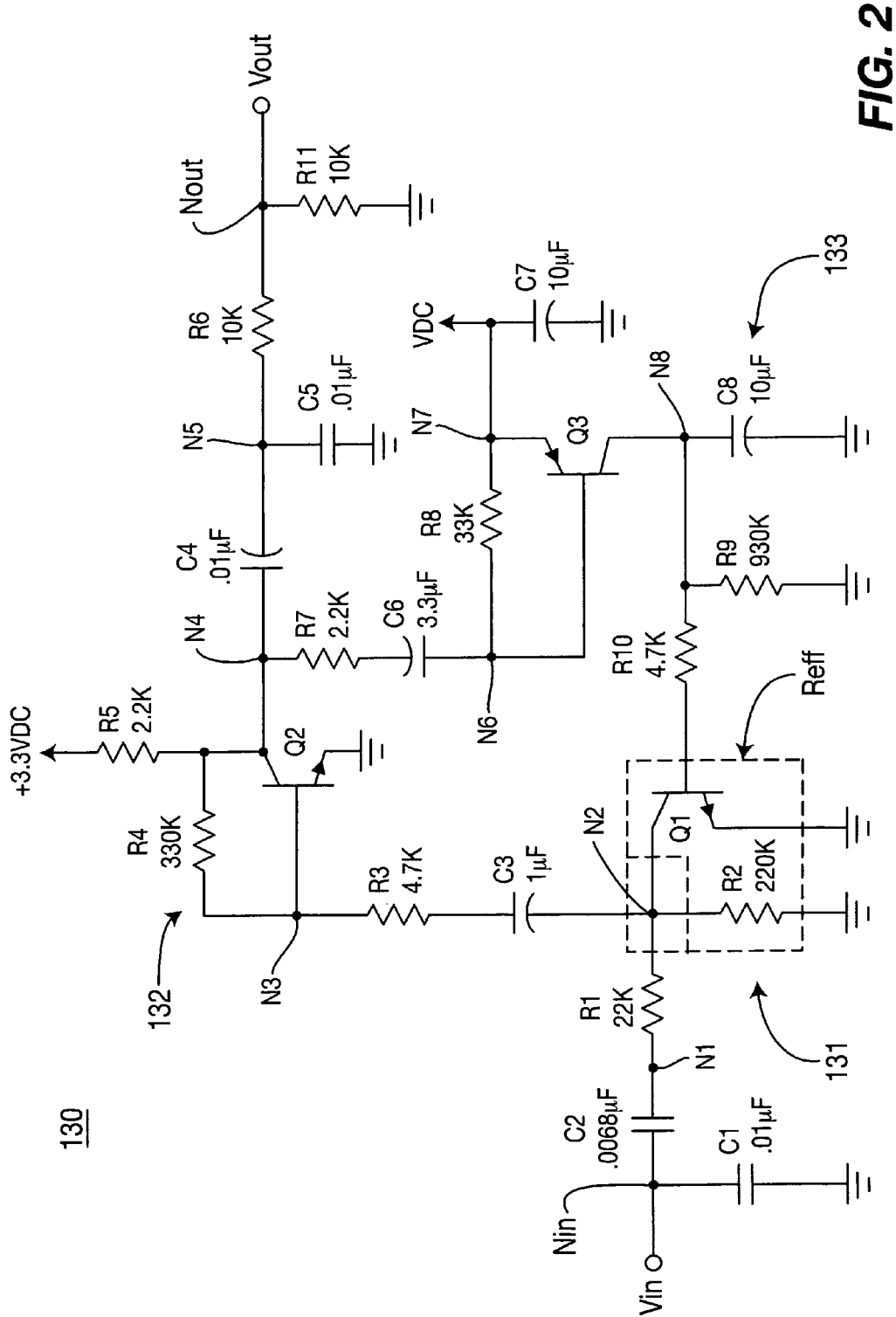
FIG. 2 is a schematic circuit diagram of an analog ALC (automatic level control) circuit according to an exemplary embodiment of the invention.

FIG. 2 is a schematic circuit diagram of an analog ALC (automatic level control) circuit according to an exemplary embodiment of the invention. In particular, FIG. 2 illustrates an exemplary unbalanced (single-ended input) analog ALC circuit (130) that may be implemented in the system of FIG. 1 to control the output level of the microphone (11). In general, the ALC circuit (130) has an input node ($N_{IN}$) that is connected to the positive output terminal of the microphone and an output node ($N_{OUT}$) that is electrically connected to an input circuit (e.g., a A/D converter) of the DSP circuitry (14). The ALC circuit (130) operates to attenuate or boost the audio signal level output from the microphone to a constant level at the output node ($N_{OUT}$).

In general, the analog ALC circuit (130) comprises a plurality of bipolar junction transistors Q1, Q2 and Q3, a plurality of resistors (R1~R10), a plurality of capacitors (C1~C8) forming various stages. In general, the ALC (130) includes a level control circuit (131) coupled to an input stage, an amplifier stage (132) and bias control circuit (133). The level control circuit (131) adjusts a level of an analog audio signal output from the microphone. The amplifier (132) amplifies the level-adjusted analog audio signal to generate an output audio signal. The bias control circuit (133) is connected to the output of the amplifier state (132) and controls a bias applied to the level control circuit (131) based on a level of the output audio signal so that an amount of level-adjustment applied to the audio signal can be obtained as needed to maintain the output of the amplifier (132) at a stable level. IN this manner, the ALC circuit (130) operates to attenuate or boost the audio signal level output from the microphone to a constant level at the output node ($N_{OUT}$).

At the input stage of the ALC circuit (130), the microphone input Vin is filtered by capacitor C1 connected to ground, and coupled to node N1 via coupling capacitor C2. The transistor Q1 is an NPN transistor having a collector connected to N2 and emitter connected to ground. The transistor Q1 is a shunt element (in parallel with resistor R2) whose impedance (Rce) at audio frequencies is effectively controlled by the amplified input signal to adjust the voltage at N2. In particular, Q1 and R1 form a voltage dividing circuit to divide the voltage input at N1 and dynamically adjust the signal level at N2 based on the impedance from N2 to ground.

The signal at N2 (output of the level control stage 131) is an input to the amplification stage (132) formed by transistor Q2. Q2 is an NPN transistor that is configured as a voltage amplifier in a common emitter configuration. Q2 has a base connected to node N3, a collector connected to node N4 and an emitter connected to ground. R4 is a bias resistor connected between N3 and N4 (between base and collector) providing a self-bias arrangement with negative feedback from collector to the base to develop forward bias. The collector is coupled to a positive terminal of a DC voltage Vdc via a collector resistor R5. The base at N3 is coupled to N2 via coupling capacitor (C3) and resistor R3. The capacitor C3 isolates the DC bias currents of Q1 and Q2

The amplified audio signal at N4 is coupled to node N5 via coupling capacitor C4. The voltage at N 5 is filtered via capacitor C5 connecting N5 to ground. The resistors R6 and R11 form a voltage-dividing network to reduce the amplitude of the amplified audio signal at node $N_{OUT}$ by ½, for example.

The amplified audio signal at N4 is input to the bias control circuit (133). In particular, the amplified audio signal at N4 is coupled to node N6 via resistor R7 and coupling capacitor C6, wherein the voltage at N6 is input to a base of Q3. In the exemplary embodiment of FIG. 2, Q3 is a PNP transistor operating as a current amplifier in a common-emitter configuration. In particular, the emitter of Q3 at node N7 is coupled to the base at N6 via resistor R8 and coupled to the positive terminal of DC power supply Vdc, thus providing a fixed DC bias. The collector of Q3 is coupled at node N8 to capacitor C8 and resistor R9, which are connected in parallel between N8 and ground. In addition, the collector at N8 is coupled to the base of Q1 through series resistor R10. The bias current output from the collector of Q3 charges the capacitor C8 and serves to set up a bias to the input of Q1. During operation, the current output from the collector of Q3 at node N8 serves to charge the capacitor and provide base current to Q1 to change the conduction of Q1 and thus, change the impedance at N2.

More specifically, an audio signal output from the microphone at Nin is coupled to N1 and attenuated to some level at N2 based on the resistance ratio of R1 and Reff. The audio signal at N2 is amplified by amplifier Q2 and output to N4. The amplified audio signal at N4 is input to the base of Q3 via R7 and C6. As the average level of the amplified signal at N4 increases over a threshold, charging current output from Q3 flows to N8 to charge the capacitor C8 and develop a bias for Q1. As a result, Q1 is activated, and reduces the impedance between N2 and ground. The reduced impedance across Q1 pulls down the input signal at node N2. On the other hand, as the average level of the amplified signal at N4 decreases below a threshold, the forward bias of Q3 is decreased which, in turn, decreases the gain of the amplifier Q3. As a result, charging current to capacitor C8 output from Q3 decreases or is cut off. As a result, Q1 is deactivated, and the impedance between N2 and ground is increases. The increased impedance across Q1 pulls up the input signal at node N2, thus increasing the level of the amplified signal at N4. Thus, the signal at Nout is maintained at a constant level.

In FIG. 2, a charge/discharge time constant is determined by C8 and R9, and preferably chosen to be longer than the period (1/f) of the lowest audio frequency present in the output of Q3. Because of the longer time constant, C8 will not discharge much between peaks of the applied signal at N4 and the voltage across C8 will be essentially a dc voltage. This voltage is proportional to the average signal amplitude at N4. If the signal strength varies, C8 will either increase or decrease its charge, depending on whether the signal at N4 increases or decreases. Since the charge on the C8 responds only to changes in the average signal level, instantaneous variations in the signal will not affect the voltage at N4.

As described above, the addition of an ALC to the microphone output level operates to expand the microphone output levels for low-level amplitudes and compress microphone output levels for high amplitudes. For example, a gain below input amplitudes of 250 mV can be +6 dB while the gain above 250 mV is −6 dB. The addition of the ALC improves performance in both problem areas—the "hollow" or "in a tunnel" effect is drastically improved while the excessive microphone output level is curtailed making the Line Echo Cancellation more effective.

Although the above embodiments are described with regard to speakerphone operation, the present principles can be applied to handset operation. Moreover, although unbalanced (single-ended) frameworks are described herein, the present principles could be applied to balanced ALC designs for balanced microphone circuits.

Although exemplary embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An audio communications device, comprising:
    a microphone to generate an audio signal;
    an analog automatic level control (ALC) circuit, coupled to an output of the microphone, to control a level of the audio signal output from the microphone and output a level-controlled audio signal, wherein the ALC circuit comprising:
        a voltage amplifier to amplify the audio signal output from the microphone and generate an amplified audio signal; and
        an analog control circuit to adjustable control a level of the audio signal input to the voltage amplifier according to a level of the amplified audio signal and increase or decrease the level of the amplified audio signal to a constant level; and
    a DSP (digital signal processing) circuit to process the level-controlled audio signal output from the ALC circuit.

2. The device of claim 1, wherein the voltage amplifier includes an NPN bipolar junction transistor (Q2) in a common emitter configuration with self bias.

3. The device of claim 1, wherein the analog control circuit comprises:
    a voltage divider circuit comprising a first fixed resistance (R1) connected between a first and second node (N1, N2) of the ALC circuit and a second fixed resistance (R2) connected between the second node (N2) and ground, wherein the first node (N1) is coupled to an input of the ALC circuit and wherein the second node (N2) is coupled to an input of the voltage amplifier;
    a shunt active device (Q1) connected in parallel to the second fixed resistance (R2), wherein the shunt active device (Q1) has an impedance at audio frequencies that varies by changing a bias of the shunt active device; and
    a bias control circuit that adjustably controls a bias of the shunt active device (Q1) based on a level of the amplified audio signal to change an impedance of the shunt device, wherein a change of impedance of the shunt device (Q1) increases or decrease an audio signal level at the input to the voltage amplifier at the second node.

4. The device of claim 3, wherein the shunt active device is an NPN bipolar junction transistor having a collector connected to the second node, an emitter connected to ground, and a base connected to the bias control circuit.

5. The device of claim 3, wherein the bias control circuit comprises:
    a current amplifier (Q3) having an input coupled to an output of the voltage amplifier;
    an RC network comprising a bias resistor (R9) and capacitor (C8) connected in parallel between an output of the current amplifier (Q1) and ground;

wherein the current amplifier (Q1) is controlled by the output of the voltage amplifier to source charging current to the RC network and set a bias for the active shunt device (Q1).

6. The device of claim 5, wherein the current amplifier is a PNP bipolar transistor having a collector connected to the RC network, a base connected to an output of the voltage amplifier and an emitter coupled to a positive terminal of a DC voltage source and a bias resistor connected between the base and the positive terminal of the DC voltage source.

7. A method for processing audio signals in an audio communications device, comprising:
   outputting an analog audio signal from a microphone;
   level adjusting the analog audio signal;
   amplifying the level-adjusted analog audio signal to generate an output audio signal; and
   digital signal processing the output audio signal,
   wherein an amount of level adjusting applied to an analog audio signal is dynamically controlled based on a level of the output audio signal to maintain the output audio signal at a constant level, and
   wherein level adjusting the analog audio signal comprises dividing the analog audio signal according to a ratio based on a fixed resistance and variable resistance, and controlling the variable resistance to change an amount of level adjusting applied to the analog audio signal.

8. The method of claim 7, wherein controlling the variable resistance comprises changing a bias applied to an active device to change an impedance of the active device.

9. The method of claim 8, wherein changing a bias applied to the active device comprises controlling an amount of bias in response to a level of the output signal.

10. The method of claim 8, wherein changing a bias applied to the active device comprises charging and discharging a capacitor of an RC network having a time constant that is smaller than a period of a lowest audio frequency of operation.

11. The method of claim 8, wherein the active device in an NPN bipolar transistor.

* * * * *